Aug. 18, 1953 A. HORNER 2,649,201
MEANS OF SORTING OBJECTS BY THEIR WEIGHT
Filed Sept. 6, 1947 3 Sheets-Sheet 1

INVENTOR,
ALBERT HORNER
BY
James M. Abbott
ATTORNEY.

Aug. 18, 1953 — A. HORNER — 2,649,201
MEANS OF SORTING OBJECTS BY THEIR WEIGHT
Filed Sept. 6, 1947 — 3 Sheets-Sheet 2

INVENTOR,
ALBERT HORNER
BY
James M. Abbott
ATTORNEY.

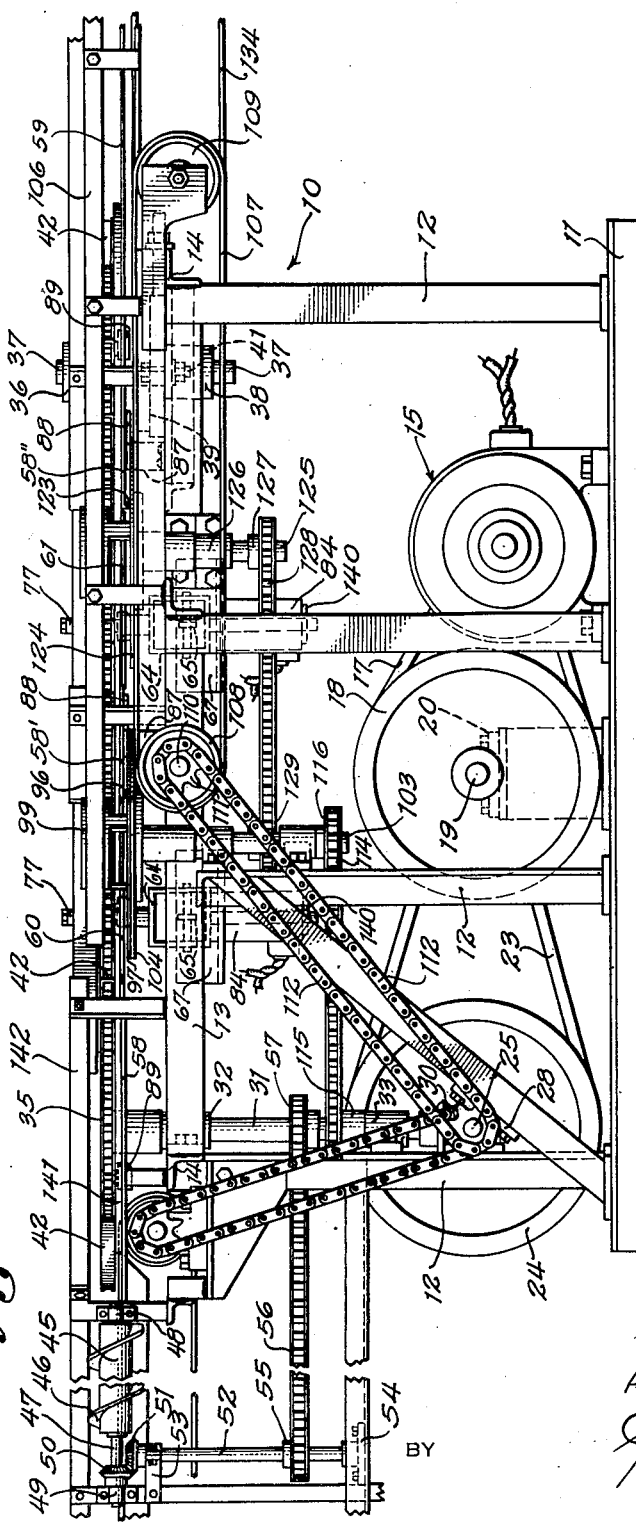

Patented Aug. 18, 1953

2,649,201

UNITED STATES PATENT OFFICE 2,649,201

MEANS OF SORTING OBJECTS BY THEIR WEIGHT

Albert Horner, Kapaa, Territory of Hawaii, assignor to Hawaiian Canneries Company, Limited, Kapaa, Kauai County, Territory of Hawaii, a corporation of Hawaii Application September 6, 1947, Serial No. 772,545

3 Claims. (Cl. 209—121)

This invention relates to weighing machinery, and particularly pertains to means of sorting objects by their weight.

In handling products which are to be selected as having uniform weight or in packaging products where it is necessary to insure that the individual containers are filled with a quantity of material, the aggregate of which has a uniform weight, it is common practice to fill containers automatically with an amount of a product approximating a desired weight, and then to check the containers individually or at intervals along the run of containers in a manual operation to ascertain the weight, after which the amount of contents of the container is adjusted to insure that the contents will exceed a specified minimum weight. These automatic and manual operations involve considerable time and labor, with the result that the cost per package unit is increased of necessity. It is desirable to provide means acting automatically therefore to sort articles, packages or containers by weight. It is the principal object of the present invention, therefore, to provide a method and means of handling articles so that articles meeting a desired weight specification will pass through the machine without requiring any attention, and so that packages which are above minimum weight and packages which are below minimum weight may be separated from each other and from the packages meeting specification, thus allowing this relatively small proportion of packages to be corrected as to weight in a simple and rapid operation.

The present invention contemplates the provision of means for moving objects, packages or containers along a horizontal runway and across weighing means whereby said objects may be sorted as to weight and segregated into objects meeting weight specification, objects below weight specification, and those above weight specification, the said structure acting automatically to produce these operations.

The invention is illustrated by way of example in the accompanying drawings in which:

Fig. 3 is a view in front elevation showing the conveyor and driving mechanism.

Figure 1:
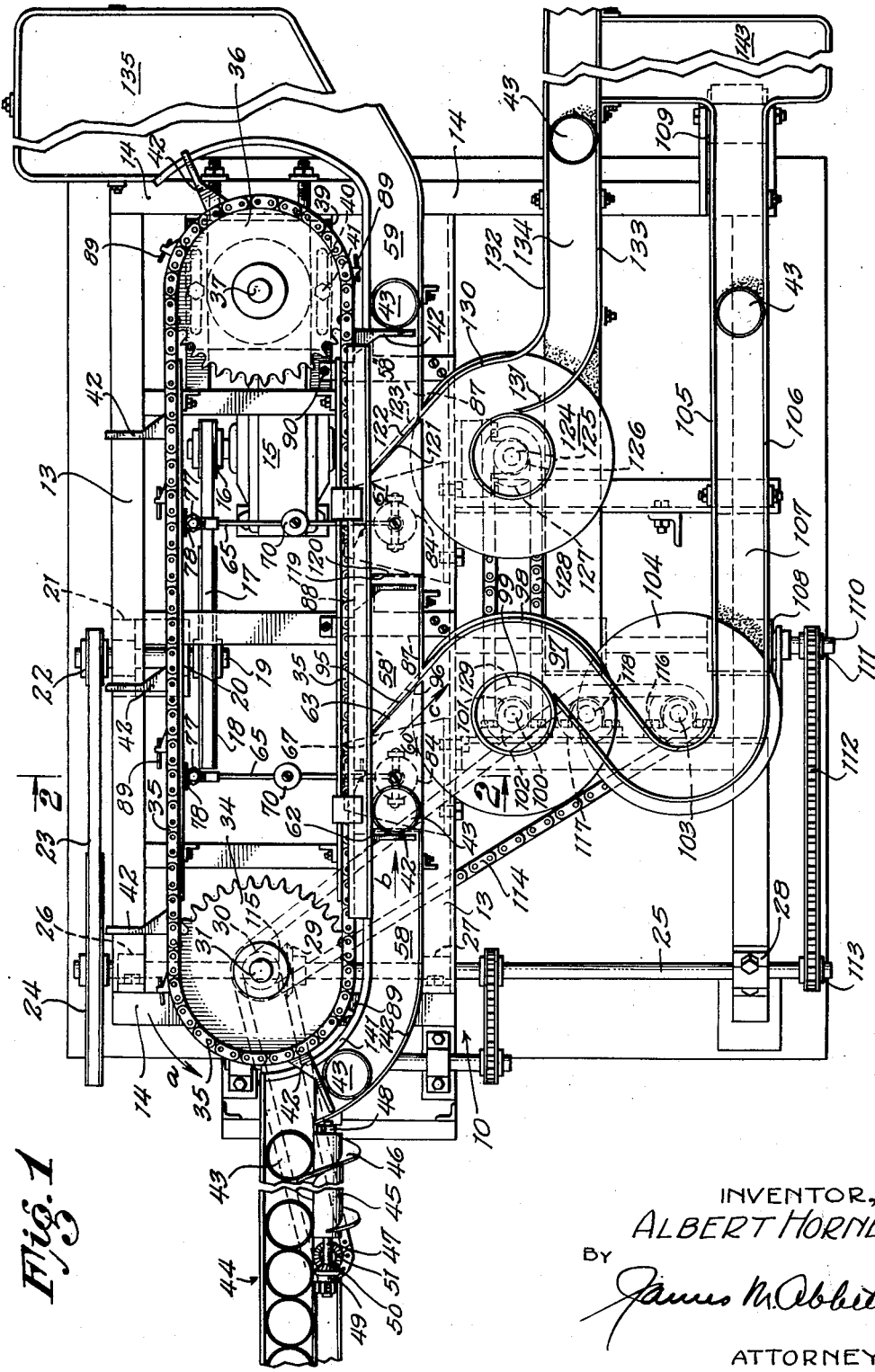
Figure 1 is a view in plan showing the complete machine with which the present invention is concerned.
Figure 2:
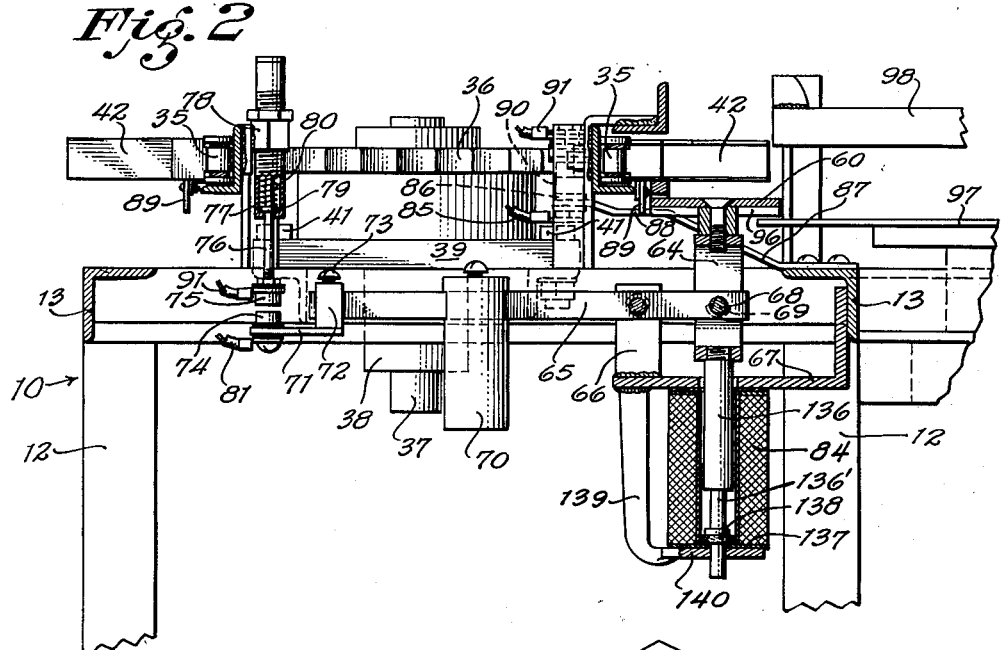
Fig. 2 is a view in transverse vertical section through the machine as seen on the line 2—2 of Fig. 1 and discloses the construction of a weight unit.

Referring more particularly to the drawings, 10 indicates a main frame. This frame comprises base rails 11 which carry a plurality of vertical uprights 12. Mounted on the upper ends of the uprights 12 is a rectangular frame structure comprising horizontal side rails 13 and transverse end rails 14. The base rails provide a support for a driving motor 15 which is fitted with a pulley 16. The pulley 16 carries a belt 17 which is led around a relatively large pulley 18. The pulley 18 is mounted upon a jack shaft 19. The jack shaft 19 is carried in bearings 20 and 21. At the outer end of the jack shaft 19, as shown in Fig. 1 of the drawing, is a pulley 22. This pulley carries a belt 23. The belt 23 is led around a relatively large reduction pulley 24. The reduction pulley 24 is mounted at one end of a transmission shaft 25. The shaft 25 is supported in a series of bearings 26, 27 and 28. This shaft extends horizontally. Mounted upon the shaft 25 is a bevel gear 29 which meshes with a bevel gear 30. The gear 30 is carried upon a vertical sprocket shaft 31. The sprocket shaft 31 is supported from the frame structure 10 in bearings 32 and 33. Mounted upon the upper end of the shaft 31 is a sprocket wheel 34. This sprocket wheel is designed to receive a conveyor chain 35, which chain lies in a horizontal plane. The conveyor chain 35 is also led around a sprocket 36 mounted upon a shaft 37. The shafts 31 and 37 are parallel to each other. The shaft 37 is mounted in a suitable bearing structure 38. The bearing structure is carried upon a horizontally disposed plate 39 which is formed with parallel slots 40. Bolts 41 pass through the bearing structure at opposite sides of the shaft 37 and permit the bearing structure 38 to be moved bodily to properly tension the conveyor chain 35. At intervals throughout the length of the conveyor chain 35 are horizontally extending feed fingers 42 which will engage articles such as cans 43. The fingers are spaced a distance from each other in order to carry the containers 43 through the machine in proper synchronism with the mechanism to permit a desired sorting operation to take place. The containers 43 are here shown as being fed into the machine along a can runway 44. In this runway the cans are crowded forwardly one at a time with the cans resting upon their bottoms. A timing member 45 is disposed adjacent to the discharge end of the runway. This member includes a cylindrical body portion around which a helical blade 46 is formed. The timing member 45 is mounted on a shaft 47 carried in bearings 48 and 49. The shaft 47 is driven by a bevel gear 50 which is mounted upon it and which is in mesh with a bevel gear 51 carried upon a vertical timing shaft 52. The timing shaft 52 is supported in bearings 53 and 54. A pulley 55 is mounted upon the shaft 52 and receives a belt 56 which leads around the pulley 57. The pulley 57 is mounted upon the vertical sprocket shaft 31. Thus the sprocket shaft 31 and the timing shaft 52 are driven in synchronism in a manner to insure that the cans flowing into the machine will be separated by the timing device 45 so that the cans will be consecutively engaged by the feed fingers 42 on the conveyor chain. The cans from the runway 44 feed onto a floor 58 which extends horizontally from the end of the runway around a portion of the circumference of the gear 34 in an arcuate path and then along a straight path to a discharge runway 59. The straight length of the floor 58 extends along the outer side of the length of conveyor chain 35 extending from center to center of the shafts 31 and 37. The floor 58 is interrupted along its straight length by a scales platform 60 for segregating heavy cans and by a scales platform 61 for segregating satisfactory cans from light-weight cans. An intermediate fixed floor section 58' bridges the gap between the platforms 60 and 61. The scales platform 60 agrees in width with the width of the floor 58. The edge of the platform first encountered by a container 43 in its travel is defined by a transverse straight edge 62. The opposite edge of the scales platform 60 is obliquely inclined, as indicated at 63, and leads outwardly and forwardly from the inner edge of the platform. The scales platform 60 is mounted upon a vertical yoke 64 having a central vertical slot to receive one end of a scales beam 65. This beam is mounted pivotally upon a bracket 66 carried by a support 67 which is secured to one of the frame side rails 13. A suitable pivot pin 68 extends through the yoke 64 and an opening 69 in the beam 65 so that the platform 60 will be properly supported upon it. The opposite arm of the beam 65 from that upon which the platform is supported extends inwardly beneath the sprocket chain and is fitted with a suitable counterbalancing weight 70 which may be moved to adjust the scales. At the free end of the long arm of the beam 65 an electric contact arm 71 is mounted. This arm is formed with a sliding bearing 72 which may be set at a desired adjusted position by a set screw 73. An electric contact element 74 is mounted upon and insulated from the arm 71 for a purpose to be hereinafter described. The contact member 74 is designed to move into engagement with a contact member 75 when a can on the platform 60 is over-weight, since the long arm of the beam 65 will swing upwardly at that time. The contact member 75 is mounted upon an adjusting stem 76. This stem extends upwardly into a tubular housing 77 which is fixed in a bearing bracket 78. A shoulder 79 is formed on the stem 76 and is engaged by a spring 80 mounted within the tubular member 77 and acting to yieldably hold the contact member 75 in a set position so that when it is engaged by the contact member 74 it may move upwardly. The contact member 74 is connected with a conductor 81 which leads to a source of electric energy 82. The opposite side of the source 82 connects to a conductor 83. This conductor leads to one end of a solenoid winding 84. The opposite end of this winding is provided with a conductor 85. This conductor leads to a contact member 86 which is carried by a spring arm 87. The spring arm 87 extends beneath the scales platform 60 and has a cam portion 88 beyond the edge of the floor sections 58' and 58'' nearest to the conveyor chain 35. A cam finger 89 extends downwardly from each of the feed fingers 42 to strike and depress the spring arm 87. This will move contact member 86 out of engagement with a contact 90 and will interrupt the electric circuit through conductor 91. The cam fingers 89 are disposed a desired distance to the rear of the feed fingers 42 to insure that after the solenoid circuit has been energized and a container has been discharged from the scales platform 60 the solenoid circuit will be positively broken, thus allowing the platform to be restored to its original horizontal plane in alignment with the floor 58.

As previously explained, the forward edge 63 of the scales platform 60 is obliquely inclined. Under normal conditions this edge of the platform is horizontally aligned with a correspondingly inclined edge 95 of the intermediate floor section 58'. The edge 95 of the floor section is formed with a down-turned flange 96 so that when the scales platform 60 is in a position below the plane of the floor 58' the flange 96 will form an obliquely disposed barrier across the path of travel of the container 43 which has been over-weight and has caused the scales platform 60 to be depressed. The direction of inclination of the flange 96 is outwardly and forwardly from the inner edge of the floor. Thus a can encountering this flange will be shifted laterally from the scales platform 60 as a feed finger 42 tends to push it forwardly. A can discharge disc 97 is disposed at the edge of the scales platform 60 to receive the container 43 as it is forced off of the platform. A pair of guide rails 98 and 99 extend over the discharge disc 97 to receive the container 43, the outermost guide rail being positioned so that the flange 96 will be tangent to the arc of the rail. The discharge disc 97 is mounted upon a vertical shaft 100, which shaft is carried in bearings 101 on the frame structure. At the lower end of the shaft 100 is a sprocket 102. Disposed in the same transverse plane as the axis of the shaft 100 is a shaft 103. The shaft 103 is also mounted in a series of bearings 101 carried by the frame and is spaced a distance from the shaft 100 to accommodate a second discharge disc 104. The discharge disc 104 is of a diameter to extend under the edge of the discharge disc 97 so that cans may be fed from the feed disc 97 onto the discharge disc 104 and along a continuation of the guide rails 98 and 99 which extend around and over the face of the discharge disc 104 and connect with a pair of straight parallel guide rails 105 and 106. Beneath the guide rails 105 and 106 is a horizontally moving feed belt 107 mounted upon pulleys 108 and 109. The pulley 108 is carried upon a horizontal shaft 110 mounted in suitable bearings on the frame, and which shaft carries a sprocket 111. The sprocket 111 receives a drive chain 112 which leads around a sprocket 113 on the transmission shaft 25.

The shafts 100 and 103 are driven by a sprocket chain 114 which is led around a sprocket 115 mounted upon the conveyor shaft 31. This chain is also led around a sprocket wheel 116 mounted upon the shaft 103 and an idler sprocket 117 mounted upon an idler shaft 118. The idler sprocket disposes one run of the chain 114 in driving engagement with the sprocket 102. By this driving arrangement the two feed discs 97 and 104 will rotate in the same direction and will carry the containers 43 forwardly onto the belt 107. These are the containers which are overweight. They are taken to a table where contents can be removed from them to bring them within the limits of proper weight.

Figure 4:
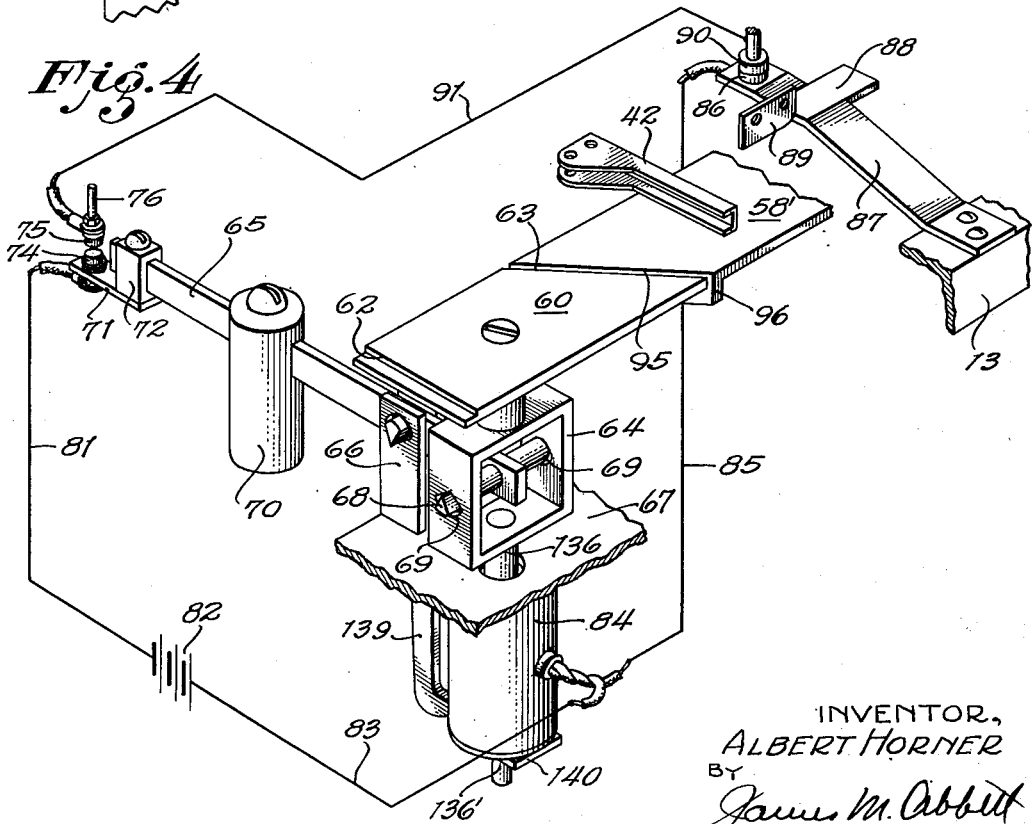
Fig. 4 is a view in perspective showing the sorting mechanism control and indicating the electric circuit involved therein.

The opposite end of the floor section 58' from the oblique edge 63 is formed with a square transverse edge 119. This edge is parallel to an edge 120 on the scales platform 61. The opposite edge of the scales platform 61 is formed with an oblique edge 121 which is parallel to an edge 122 formed on the floor continuation 58". A downturned flange 123 is formed along the edge 122 and agrees in construction and purpose the same as the down-turned edge 96 on the floor section 58'. The platform 61 is fitted with a scales and solenoid construction identical with that shown in Fig. 4 of the drawing with relation to the scales platform 60, the difference between the two structures being that the counterweight 70 in connection with the scales platform 60 is set so that the platform will respond to a weight in excess of a specified minimum weight while the counterweight 70 used in connection with the scales platform 61 is set so that the scales will respond to a maximum specified weight. Thus the scales platform 61 will respond to cans within a given maximum and minimum weight. A discharge disc 124 is provided to receive the cans. This disc is mounted upon a shaft 125 carried by bearings 126. A sprocket 127 is mounted on the shaft 125 and receives a sprocket chain 128. The sprocket chain 128 leads around a sprocket 129 on the shaft 100, and thus moves in unison therewith. Guide rails 130 and 131 lead over the discharge disc 124 and have straight parallel continuing rail sections 132 and 133 between which the containers 43 of satisfactory weight may pass. A discharge belt 134 leads to appropriate processing and closing machinery. When, however, the packages have already been processed the belt leads to a packaging table where the containers 43 may be placed in suitable cartons or otherwise stored. Containers 43 which have not been deflected from the path of travel through the machine at either the scales platform 60 or 61 are then free to travel to the floor 58' and to an inspection table 135. The cans reaching this table are of light weight and operators must add sufficient material to bring them up to specifications.

As has been previously explained, the solenoid 84 is provided with electric circuits which are completed and broken by movement of the scales beams 65. Each of the solenoid coils is therefore fitted with a plunger 136 which is attached to a yoke 64 at its upper end. The lower end of the plunger, as indicated at 136', extends through an opening in a plate 137 on the bottom of the coil 84. A buffer washer 138 is provided to limit and cushion downward movement of the plunger 136. A bracket 139 is mounted upon the frame bracket 67 and carries a bearing portion 140 through which the plunger portion 136' is guided.

In operation of the present invention, articles 43 are fed along the runway 44 to a point where they encounter the helical blade 46 of the timing member 45. At this time the stream of articles will be interrupted while the foremost article is fed forwardly at a rate of speed which will synchronize the articles with the feed fingers 42 on the conveyor chain 35. The chain will travel in the direction of the arrow $a$, as indicated in Fig. 1, and as a finger 42 sweeps across the end of the trackway 44 it will engage an article 43 and cause it to travel along the floor 58 between guide rails 141 and 142. As the feed finger pushes the article 43 forwardly along the floor 58 in the direction of the arrow $b$ as shown in Fig. 1, the article will move off of the end of the floor 58 and onto the first scales platform 60. If the article has a weight which is less than a prescribed maximum weight the article will continue to travel along the runway through the machine. If, however, the article has a weight in excess of a prescribed minimum weight then the article will depress the scales platform 60 in opposition to the counterbalance 70. The electric contacts 74 and 75 are so adjusted that after a relatively short interval of movement of the beam 65 of the scales the members 74 and 75 will be in electrical contact. It is pointed out that the beam 65 has a short lever arm to which the scales platform 60 is connected and a relatively long lever arm which carries the contact 74. Due to this arrangement a relatively small downward movement of the scales platform 60 will produce a considerable movement of the contact member 74. As soon as the contacts 74 and 75 are in engagement an electric circuit will be completed from the source of electric energy 82 along a conductor 83 to the solenoid winding 84 and thence along conductor 85 to the contact 90 carried upon the frame of the machine. At this time the contact 86 is in electrical contact with the member 90 to which a conductor 91 is attached. The circuit is then continued through the conductor 91 leading to contact 75 of the scales switch. Upon the completion of this circuit the solenoid 84 is energized instantly. This will act to pull the scales platform 60 down without delay so that the inclined flange 96 of the floor member 58' will stand as a barrier across the path of travel of the article 43. As the conveyor chain continues to move, the feed finger which is disposed in the rear of the article will force the article along the obliquely disposed flange 96 and cause it to move laterally in the direction of the arrow $c$ and onto the discharge disc 97. Since the discharge disc is rotating in the direction of the arrow $c$ the article will be carried away from the scales platform 60 and to a position between the guide rails 98 and 99. The article will continue to move along these guide rails until it passes off the edge of the disc 97 and onto the discharge disc 104.

It will then pass between the guide rails and onto the discharge belt 107. Here it will be directed between guide rails 105 and 106 and will eventually pass off onto a receiving table 143. On this table the articles which are of excess weight are inspected and a sufficient amount of the contents is removed to give the articles an approved weight. After the over-weight container has passed from the scales platform 60 the finger 89 will engage cam portion 88 of spring 87 to cause the contacts 86 and 90 to be separated. When this has been accomplished the circuit including the source of electric energy 82 will be positively broken and the counterbalance weight 70 on the scales beam 65 will act to move the scales platform 60 upwardly into the horizontal plane of the surface of the floor 58. Thus, due to the rapidity of movement of the scales platform 60 to and from its normal position the scales will be in condition to receive the next succeeding container 43 as the conveyor chain 35 moves continuously.

In the event that the weight of an article or filled container 43 is less than a predetermined maximum amount it will be carried along the floor section 58'' and deposited upon the scales platform 61 without producing movement of the scales platform 60. The containers thus being carried forward will be containers which meet weight specifications and containers which are light in weight. The counterweight 70 on the beam 65 associated with the scales platform 61 is adjusted so that it will respond to the weight of an article which is greater than a minimum amount, and since the scales platform 60 responds to an article having a weight greater than a maximum amount it will be obvious that the articles which depress the scales platform 61 are within the limits of a specified maximum and minimum weight and are therefore up to specifications. An article of this particular weight will actuate the scales platform 61 and the electrical apparatus associated therewith in the same manner as previously described for the platform 60. If the platform 61 is moved downwardly the container will encounter the obliquely disposed flange 123 and will be forced laterally off of the platform 61 as the feed finger 42 advances. The article will then be deposited upon the discharge disc 124 and will be carried around into a position along a path of travel defined by the guide rails 130 and 131 and onto the belt 134. The article will then move forwardly between the guide rails 132 and 133 to a desired point of deposit.

In the event that the article which is fed onto the scales platform 61 is of lighter weight than a specified maximum weight then it will move onto the floor secion 58'' and will be carried along the runway 59 to the inspection table 135. On this table additional material may be placed in the container which has been delivered thereto so that it will meet weight specifications.

In the present application and drawings the containers 43 have been shown as being circular cans. It is obvious, however, that articles and packages of other shapes might be handled by the machine without in any wise varying the fundamental principles of the invention, and it will also be recognized that the machine may be adjusted so that great accuracy of weight classification may be made.

In the specifications and drawings the scales have been described as being of the weighted beam type. It is obvious that other types of scales may be used, such as spring scales. It is also to be understood that it might be desirable to provide any number of scales units depending upon the sorting operation required.

It will thus be seen that the method and means here disclosed for weighing and sorting articles involves a few simple steps of procedure and a machine which operates continuously, automatically and rapidly to weigh and sort articles as they are moved through the machine.

While I have shown the preferred method for weighing and sorting articles and a preferred form of apparatus for carrying out said method, it is to be understood that variations in the steps of the method as well as changes in the combination, construction and arrangement of parts may be made by those skilled in the art without departing from the spirit of the invention as claimed.

Having thus described my invention, what I claim and desire to secure by Letters Patent is:

1. A machine for classifying articles by weight, comprising a trackway along which articles are advanced in a predetermined direction of travel, a scale unit including a normally elevated depressible platform constituting a co-planar section of said trackway, a conveyor for propelling articles along said trackway and over said platform, means for driving said conveyor, the edge of said trackway at the far side of said platform being inclined relative to the direction of travel of the articles along said trackway whereby a depression of said platform causes an article being propelled thereover to engage said inclined edge for lateral diversion from the trackway, power means actuated by an initial slight depression of said platform by the weight of an article advanced thereon by said conveyor to accelerate further depression of the platform and to hold said platform in a depressed position to insure the diversion of said article from said trackway, and means actuated by said conveyor driving means after the lateral diversion of the article from said platform for releasing said power means to permit return of said platform to elevated position.

2. In a machine for classifying articles by weight the combination of: a trackway along which articles may be propelled; a scales including a platform comprising a section of said trackway and normally disposed on the same level therewith; a conveyor having arms for propelling articles along said trackway and over said platform, the edge of said trackway at the far side of said platform being on a bias relative to the direction of travel of said articles along said trackway whereby a substantial depression of said platform causes an article being propelled thereover to engage said edge and be diverted laterally from said trackway; a normally open electric circuit including a solenoid connected to and energized by a slight depression of said platform by an article thereon to quickly impart to the platform a substantial depression thereby assuring the diversion as aforesaid of said article from said trackway; a switch in said circuit responsive to said slight platform depression to close said circuit and energize said solenoid for the purpose aforesaid; a second switch in said circuit; and means operating in timed relation with said conveyor to open said second switch at a moment when an article which has actuated said first switch has just been diverted laterally from over said platform, thereby freeing said scales to rapidly resume its normal balance with said platform on the same level as adjacent portions of said trackway.

3. In a machine for classifying articles by weight the combination of: a trackway along which articles may be propelled; a scales including a platform comprising a section of said trackway and normally disposed on the same level therewith; a conveyor having arms for propelling articles along said trackway and over said platform, the edge of said trackway at the far side of said platform being on a bias relative to the direction of travel of said articles along said trackway whereby a substantial depression of said platform causes an article being propelled thereover to engage said edge and be diverted laterally from said trackway; a normally open electric circuit including a solenoid connected to said platform to depress the same when energized; a switch in said circuit responsive to a slight depression of said platform to close said circuit and energize said solenoid; a second switch in said circuit; and a cam finger carried by said conveyor for opening said second switch at a moment when an article which has actuated said first switch has just been diverted laterally from over said platform, thereby freeing said scales to rapidly resume its normal balance with said platform on the same level as adjacent portions of said trackway.

ALBERT HORNER.

References Cited in the file of this patent

UNITED STATES PATENTS

| Number | Name | Date |
|---|---|---|
| 1,619,729 | Howard | Mar. 1, 1927 |
| 1,738,634 | Bryant | Dec. 10, 1929 |
| 1,784,540 | Ripley | Dec. 9, 1930 |
| 1,932,985 | Perkins | Oct. 31, 1933 |
| 1,994,550 | Watson | Mar. 19, 1935 |
| 2,037,484 | Raymer | Apr. 14, 1936 |
| 2,092,109 | Dodge | Sept. 7, 1937 |
| 2,116,895 | Howard | May 10, 1938 |
| 2,357,783 | Snelling | Sept. 5, 1944 |

FOREIGN PATENTS

| Number | Country | Date |
|---|---|---|
| 390,047 | France | July 17, 1907 |
| 504,332 | Great Britain | Apr. 24, 1939 |